United States Patent
Fimoff et al.

(10) Patent No.: US 7,382,826 B2
(45) Date of Patent: Jun. 3, 2008

(54) METHOD AND APPARATUS FOR THE CONTROL OF A DECISION FEEDBACK EQUALIZER

(75) Inventors: Mark Fimoff, Hoffman Estates, IL (US); Sreenivasa M. Nerayanuru, Wheeling, IL (US)

(73) Assignee: Zenith Electronics LLC, Lincolnshire, IL (US)

( * ) Notice: Subject to any disclaimer, the term of this patent is extended or adjusted under 35 U.S.C. 154(b) by 820 days.

(21) Appl. No.: 10/766,742

(22) Filed: Jan. 27, 2004

(65) Prior Publication Data

US 2005/0163209 A1 Jul. 28, 2005

(51) Int. Cl.
*H03H 7/30* (2006.01)
*H04L 25/03* (2006.01)
*H04B 3/14* (2006.01)

(52) U.S. Cl. ............... 375/229; 375/232; 375/240.02; 333/28 R; 333/165

(58) Field of Classification Search ........ 375/229–236; 708/322–323; 333/165–167, 28 R
See application file for complete search history.

(56) References Cited

U.S. PATENT DOCUMENTS

| | | | | |
|---|---|---|---|---|
| 5,031,195 A | * | 7/1991 | Chevillat et al. | ........... 375/234 |
| 6,934,345 B2 | * | 8/2005 | Chu et al. | ................... 375/346 |
| 2003/0152170 A1 | * | 8/2003 | Yousef | ........................ 375/340 |
| 2004/0013191 A1 | * | 1/2004 | Chen et al. | ................. 375/233 |

* cited by examiner

*Primary Examiner*—David C. Payne
*Assistant Examiner*—Linda Wong

(57) ABSTRACT

Input data segments of received symbols are continuously stored in a decision feedback equalizer buffer at a symbol rate S. Output data sections of received symbols are supplied from the decision feedback equalizer buffer at an output rate of nS such that void times separate the output data sections, and n>1. The received symbols supplied by the decision feedback equalizer buffer are equalized in a decision feedback equalizer to provide equalized symbols; and the equalized symbols are decoded by a decoder to provide decoded symbols. Adjustments for the decision feedback equalizer are calculated during the void times such that the adjustments are calculated based on both the received symbols supplied by the decision feedback equalizer buffer and the decoded symbols. The adjustments are applied to the decision feedback equalizer.

34 Claims, 6 Drawing Sheets

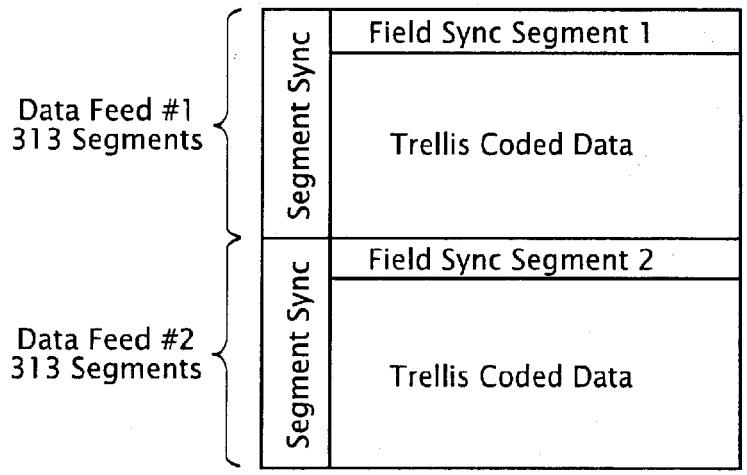
*Figure 1*
*(Prior Art)*
| Segment Sync | PN511 | PN63 | PN63 | PN63 | Mode, Reserved & Precode Symbols |
*Figure 2*
*(Prior Art)*
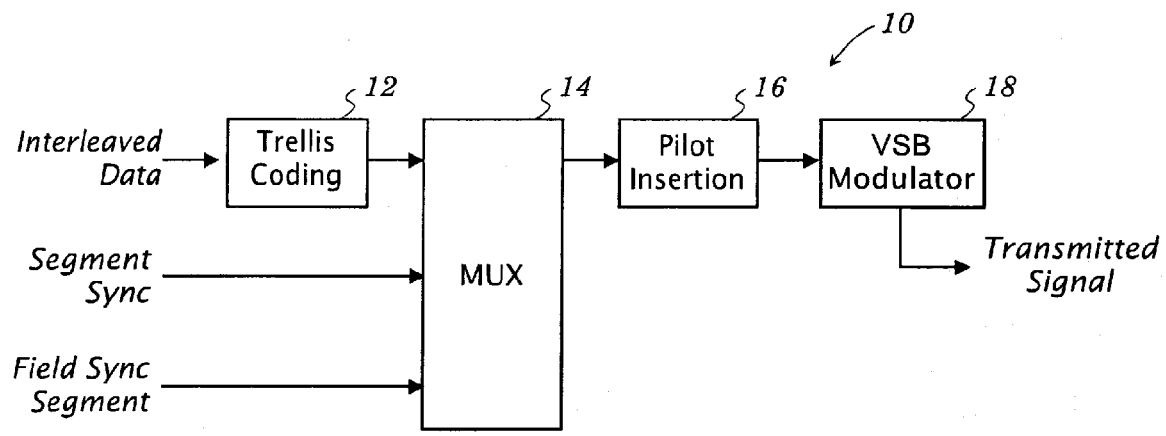
*Figure 3*
*(Prior Art)*

US 7,382,826 B2

METHOD AND APPARATUS FOR THE CONTROL OF A DECISION FEEDBACK EQUALIZER

RELATED APPLICATIONS

This application contains subject matter similar to the subject matter contained in U.S. patent application Ser. No. 10/421,014 filed Apr. 22, 2003.

TECHNICAL FIELD OF THE INVENTION

The present invention relates to equalizers and, more particularly, to equalizers that adapt to the condition of a channel through which signals are received.

BACKGROUND OF THE INVENTION

Since the adoption of the ATSC digital television (DTV) standard in 1996, there has been an ongoing effort to improve the design of receivers built for the ATSC DTV signal. The primary obstacle that faces designers in designing receivers so that they achieve good reception is the presence of multipath interference in the channel. Such multipath interference affects the ability of the receiver to recover signal components such as the carrier and symbol clock. Therefore, designers add equalizers to receivers in order to cancel the effects of multipath interference and thereby improve signal reception.

The broadcast television channel is a relatively severe multipath environment due to a variety of conditions that are encountered in the channel and at the receiver. Strong interfering signals may arrive at the receiver both before and after the largest amplitude signal. In addition, the signal transmitted through the channel is subject to time varying channel conditions due to the movement of the transmitter and signal reflectors, airplane flutter, and, for indoor reception, people walking around the room. If mobile reception is desired, movement of the receiver must also be considered.

The ATSC DTV signal uses a 12-phase trellis coded 8-level vestigial sideband (usually referred to as 8T-VSB or, more simply, as 8-VSB) as the modulation method. There are several characteristics of the 8-VSB signal that make it special compared to most linear modulation methods (such as QPSK or QAM) that are currently used for wireless transmission. For example, 8-VSB data symbols are real and have a signal pulse shape that is complex. Only the real part of the complex pulse shape is a Nyquist pulse. Therefore, the imaginary part of the complex pulse shape contributes intersymbol interference (ISI) when the channel gain seen by the equalizer is not real, even if there is no multipath.

Also, due to the low excess bandwidth, the signal is nearly single sideband. As a result, symbol rate sampling of the complex received signal is well above the Nyquist rate. Symbol rate sampling of the real or imaginary part of the received signal is just below the Nyquist rate.

Because the channel is not known a priori at the receiver, the equalizer must be able to modify its response to match the channel conditions that it encounters and to adapt to changes in those channel conditions. To aid in the convergence of an adaptive equalizer to the channel conditions, the field sync segment of the frame as defined in the ATSC standard may be used as a training sequence for the equalizer. But when equalization is done in the time domain, long equalizers (those having many taps) are required due to the long channel impulse responses that characterize the channel. Indeed, channels are often characterized by impulse responses that can be several hundreds of symbols long.

The original Grand Alliance receiver used an adaptive decision feedback equalizer (DFE) with 256 taps. The adaptive decision feedback equalizer was adapted to the channel using a standard least mean square (LMS) algorithm, and was trained with the field sync segment of the transmitted frame. Because the field sync segment is transmitted relatively infrequently (about every 260,000 symbols), the total convergence time of this equalizer is quite long if the equalizer only adapts on training symbols prior to convergence.

In order to adapt equalizers to follow channel variations that occur between training sequences, it had been thought that blind and decision directed methods could be added to equalizers. However, when implemented in a realistic system, these methods may require several data fields to achieve convergence, and convergence may not be achieved at all under difficult multipath conditions.

In any event, because multipath signals in the broadcast channel may arrive many symbols after the main signal, the decision feedback equalizer is invariably used in 8-VSB applications. However, it is well known that error propagation is one of the primary drawbacks of the decision feedback equalizer. Therefore, under severe multipath conditions, steps must be taken to control the effect of error propagation.

In a coded system, it is known to insert a decoder into the feedback path of the decision feedback equalizer to use the tentative decision of the decoder in adapting the equalizer to channel conditions. This method, or a variant of it, is applicable to the 8-VSB signal by way of the output of the trellis decoder. As discussed above, the ATSC DTV signal is a 12-phase trellis coded digital vestigial sideband signal with 8 signal levels known as 8T-VSB.

In ATSC DTV systems, data is transmitted in frames as shown in FIG. 1. Each frame contains two data fields, each data field contains 313 segments, and each segment contains 832 symbols. The first four of these symbols in each segment are segment sync symbols having the sequence [+5, −5, −5, +5].

The first segment in each field is a field sync segment. As shown in FIG. 2, the field sync segment comprises the four segment sync symbols discussed above followed by a pseudo-noise sequence having a length of 511 symbols (PN511) followed in turn by three pseudo-noise sequences each having a length of 63 symbols (PN63). Like the segment sync symbols, all four of the pseudo-noise sequences are composed of symbols from the set {+5, −5}. In alternate fields, the three PN63 sequences are identical; in the remaining fields, the center PN63 sequence is inverted. The pseudo-noise sequences are followed by 128 symbols, which are composed of various mode, reserved, and precode symbols.

Because the first 704 symbols of each field sync segment are known, these symbols, as discussed above, may be used as a training sequence for an adaptive equalizer. All of the three PN63 sequences can be used only when the particular field being transmitted is detected so that the polarity of the center sequence is known. The remaining data in the other 312 segments comprises trellis coded 8-VSB symbols. This data, of course, is not known a-priori by the receiver.

A transmitter 10 for transmitting the 8T-VSB signal is shown at a very high level in FIG. 3. The transmitted baseband 8T-VSB signal is generated from interleaved Reed-Solomon coded data. After trellis coding by a trellis encoder 12, a multiplexer 14 adds the segment sync symbols and the field sync segment to the trellis coded data at the appropriate times in the frame. A pilot inserter 16 then inserts a pilot carrier by adding a DC level to the baseband signal, and a modulator 18 modulates the resulting symbols. The modulated symbols are transmitted as a vestigial sideband (VSB) signal at a symbol rate of 10.76 MHz.

FIG. 4 shows the portions of the transmitter and receiver relevant to the analysis presented herein. The transmitted signal has a raised cosine spectrum with a nominal bandwidth of 5.38 MHz and an excess bandwidth of 11.5% of the channel centered at one-fourth of the symbol rate (i.e., 2.69 MHz). Thus, the transmitted pulse shape q(t) (block 20, FIG. 4) is complex and is given by the following equation:

$$q(t) = e^{j\pi F_s t/2} q_{RRC}(t) \qquad (1)$$

where $F_s$ is the symbol frequency, and $q_{RRC}(t)$ is a real square root raised cosine pulse with an excess bandwidth of 11.5% of the channel. Thus, the pulse q(t) is a complex root raised cosine pulse.

The baseband transmitted signal waveform of data rate 1/T symbols/sec is represented by the following equation:

$$s(t) = \sum_k I_k q(t - kT) \qquad (2)$$

where $\{I_k \in A \equiv \{\alpha_1, \ldots \alpha_8\} \subset R^1\}$ is the transmitted data sequence, which is a discrete 8-ary sequence taking values on the real 8-ary alphabet A. The function q(t) is the transmitter's pulse shaping filter of finite support $[-T_q/2, T_q/2]$. The overall complex pulse shape at the output of the matching filter in the receiver is denoted p(t) and is given by the following equation:

$$p(t) = q(t) * q^*(-t) \qquad (3)$$

where q*(−t) (block 22, FIG. 4) is the receiver matched filter impulse response.

Although it is not required, it may be assumed for the sake of simplifying the notation that the span $T_q$ of the transmit filter and the receive filter is an integer multiple of the symbol period T; that is, $T_q = N_q T = 2L_q T$, and $L_q$ is a real integer greater than zero. For the 8-VSB system, the transmitter pulse shape is the Hermitian symmetric root raised cosine pulse, which implies that q(t)=q*(−t). Therefore, $q[n] \equiv q(t)|_{t=nT}$ is used below to denote both the discrete transmit filter and discrete receive filter.

The physical channel between the transmitter and the receiver is denoted c(t) (block 24, FIG. 4). The concatenation of p(t) and the channel is denoted h(t) and is given by the following equation:

$$h(t,\tau) = q(t) * c(t,\tau) * q^*(-t) = p(t) * c(t,\tau) \qquad (4)$$

The physical channel c(t,τ) is generally described as a time varying channel by the following impulse response:

$$c(t, \tau) = \sum_{k=-L_{ha}}^{L_{hc}} c_k(\tau) \delta(t - \tau_k) \qquad (5)$$

where $\{c_k(\tau)\} \subset C^1$, where $-L_{ha} \leq k \leq L_{hc}$, $t, \tau \in R$, and $\{\tau_k\}$ denote the multipath delays, or the time of arrivals (TOA), and where δ(t) is the Dirac delta function. It is assumed that the time variations of the channel are slow enough that c(t,τ)=c(t). Thus, the channel is assumed to be a fixed (static) inter-symbol interference channel throughout the training period such that $c_k(\tau) = c_k$, which in turn implies the following equation:

$$c(t) = \sum_{k=-L_{ha}}^{L_{hc}} c_k \delta(t - \tau_k) \qquad (6)$$

for $0 \leq t \leq L_n T$, where $L_n$ is the number of training symbols, and the summation indices $L_{ha}$ and $L_{hc}$ refer to the number of maximum anti-causal and causal multipath delays, respectively.

In general, $c_k = \tilde{c}_k e^{-j2\pi f_c \tau_k}$ where $\tilde{c}_k$ is the amplitude of the k'th multipath, and $f_c$ is the carrier frequency. It is also inherently assumed that $\tau_k < 0$ for $-L_{ha} \leq k \leq -1$, $\tau_0 = 0$, and $\tau_k > 0$ for $1 \leq k \leq L_{hc}$. The multipath delays $\tau_k$ are not assumed to be at integer multiples of the sampling period T.

Equations (4) and (6) may be combined according to the following equation (where the τ index has been dropped):

$$h(t) = p(t) * c(t) = \sum_{-L_{ha}}^{L_{hc}} c_k p(t - \tau_k) \qquad (7)$$

Because both p(t) and c(t) are complex valued functions, the overall channel impulse response h(t) is also complex valued. By using the notation introduced herein, the matched filter output y(t) in the receiver is given by the following equation:

$$y(t) = \left(\sum_k \delta(t - kT)\right) * h(t) + v(t) \qquad (8)$$

where $$v(t) = \eta(t) * q^*(-t) \qquad (9)$$

denotes the complex (colored) noise process after the pulse matched filter (denoted by block 25, FIG. 4), with η(t) being a zero-mean white Gaussian noise process with spectral density $\sigma_\eta^2$ per real and imaginary part. The matched filter output y(t) can also be written in terms of its real and imaginary parts as $y(t) = y_I(t) + j y_Q(t)$.

Sampling the matched filter output y(t) (sampler 26, FIG. 4) at the symbol rate produces the discrete time representation of the overall communication system according to the following equation:

$$y[n] \equiv y(t)|_{t=nT} = \sum_k I_k h[n-k] + v[n] \qquad (10)$$

Prior art equalizers have known problems previously discussed, such as having difficulty in converging under severe multipath conditions.

The present invention provides a novel technique to provide improved convergence time of equalizers and/or to solve other problems associated with equalizers.

SUMMARY OF THE INVENTION

In accordance with one aspect of the present invention, a method of operating an equalizer comprises the following: continuously storing input data segments of received symbols in a decision feedback equalizer buffer at a symbol rate S; supplying output data sections of received symbols from the decision feedback equalizer buffer at an output rate of nS such that void times separate the output data sections, wherein n>1; equalizing the received symbols supplied by the decision feedback equalizer buffer in a decision feedback equalizer to provide equalized symbols; decoding the equalized symbols by a decoder to provide decoded symbols; calculating adjustments for the decision feedback equalizer during the void times such that the adjustments are calculated based on both the received symbols supplied by the decision feedback equalizer buffer and the decoded symbols; and, applying the adjustments to the decision feedback equalizer.

In accordance with another aspect of the present invention, a method of operating an equalizer comprises the following: continuously storing input data segments of received symbols in a decision feedback equalizer buffer at a symbol rate S; supplying output data sections of received symbols from the decision feedback equalizer buffer at an output rate of nS such that void times separate the output data sections, wherein n>1; equalizing the received symbols supplied by the decision feedback equalizer buffer in a decision feedback equalizer to provide equalized symbols, wherein the decision feedback equalizer comprises taps having tap weights; decoding the equalized symbols by a decoder to provide decoded symbols; estimating a channel impulse response based on both the received symbols supplied by the decision feedback equalizer buffer and the decoded symbols; calculating the tap weights for the decision feedback equalizer based on the estimated channel, wherein the estimating of the channel impulse response and the calculating of the tap weights are performed during the void times; and, applying the calculated tap weights to the decision feedback equalizer.

In accordance with yet another aspect of the present invention, a method of operating an equalizer comprises the following: supplying segments of received symbols to the equalizer to produce equalized segments, wherein each of the segments of received symbols occupies a corresponding segment time period; decoding the equalized segments by a decoder to produce decoded segments; calculating adjustments for the equalizer based on n decoded segments and n segments of received symbols, wherein n≧1, and wherein the calculating of adjustments is performed in a pipelined manner at least twice per segment time period; and, applying the adjustments to the equalizer.

BRIEF DESCRIPTION OF THE DRAWINGS

These and other features and advantages will become more apparent from a detailed consideration of the invention when taken in conjunction with the drawings in which:

FIG. 1 illustrates a data frame according to the ATSC DTV standard;

FIG. 2 illustrates the field sync segment of the fields comprising the frame of FIG. 1;

FIG. 3 illustrates a portion of a transmitter relevant to the transmitting of an 8T-VSB signal;

DETAILED DESCRIPTION

Figure 4:
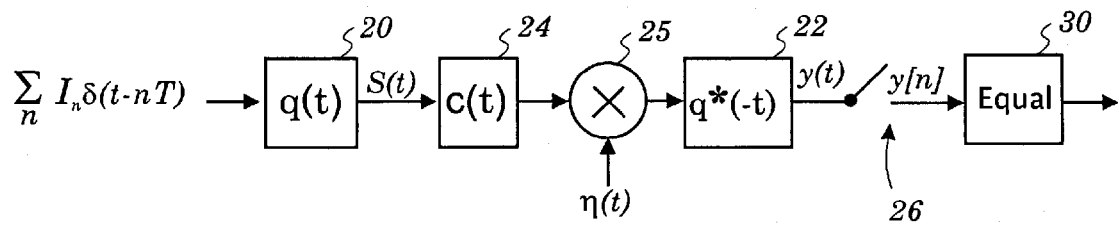
FIG. 4 illustrates portions of a transmitter and receiver relevant to the present invention.
Figure 5:
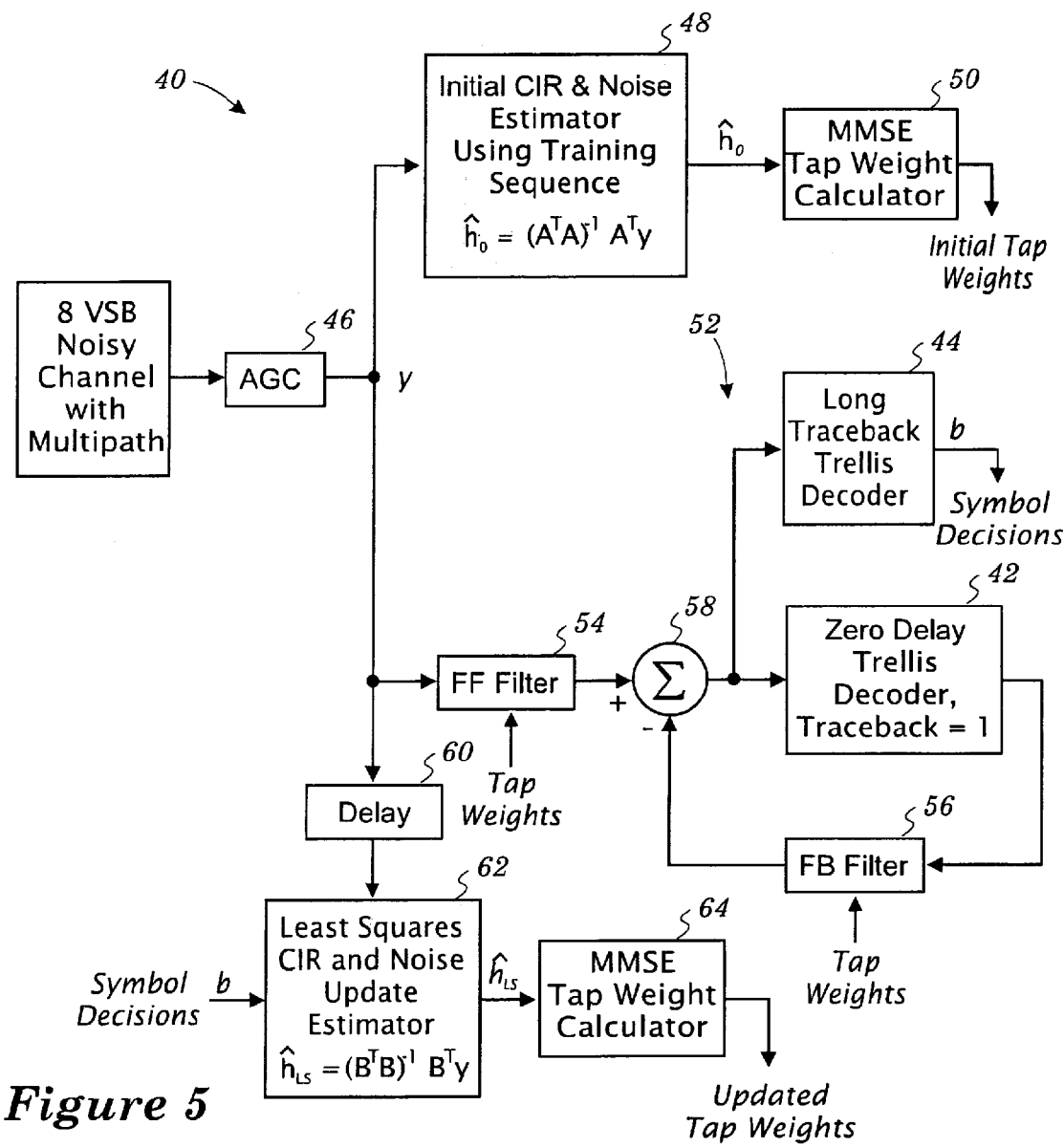
FIG. 5 illustrates a tracking decision feedback equalizer system according to an embodiment of the present invention.

FIG. 5 illustrates a decision feedback equalizer system 40 that avoids and/or mitigates the convergence and/or tracking problems of previous decision feedback equalizers. The tap weights are calculated based on estimates of the channel impulse response. This arrangement makes use of trellis decoders 42 and 44. The trellis decoder 42 has a short traceback depth, and the trellis decoder 44 has a long traceback depth. Each of the short traceback trellis decoder 42 and the long traceback trellis decoder 44 may be a 12-phase trellis decoder.

The signal from the channel is processed by a tuner 45 and a synchronization circuit 46 which provides the output y. The synchronization circuit 46 also provides frame sync and symbol clock signals. An initial channel impulse response and noise estimator 48 uses the training sequence to provide an initial estimate $\hat{h}_0$ of the channel impulse response. A tap weight calculator 50 calculates an initial set of tap weights based on the initial estimate $\hat{h}_0$ the channel impulse response using, for example, a MMSE based algorithm, and supplies this initial set of tap weights to a decision feedback equalizer 52 comprising a feed forward filter 54 and a feedback filter 56.

The decision feedback equalizer 52 equalizes the data symbols contained in the output y based on these initial tap weights and includes a summer 58 which supplies the output of the decision feedback equalizer 52 to the short traceback trellis decoder 42 and the long traceback trellis decoder 44. The output of the long traceback trellis decoder 44 forms the symbol decisions b. The feedback filter 56 filters the output of the short traceback trellis decoder 42, and the filtered output of the feedback filter 56 is subtracted by the summer 58 from the output of the feed forward filter 54.

The output y is delayed by a delay 60, and the delayed output y and the symbol decisions b are processed by a least squares channel impulse and noise update estimator 62 that produces an updated channel impulse estimate $\hat{h}_{Ls}$. A tap weight calculator 64 uses the updated channel impulse estimate $\hat{h}_{Ls}$ to calculate an updated set of tap weights for the decision feedback equalizer 52. The tap weights determined by the tap weight calculator 64 are provided to the decision feedback equalizer 52 during periods when the tap weights based on the training sequence are not available. The delay imposed by the delay 60 is equal to the delay of the decision feedback equalizer 52 and of the long traceback trellis decoder 44.

In a transmitter according to the ATSC standard, 8 VSB data symbols are trellis coded utilizing a 12-phase coding technique. Most commonly, a decision feedback equalizer in an 8 VSB receiver is expected to use an 8 level slicer for a symbol decision device in the feedback loop of the decision feedback equalizer. However, the use of an 8 level slicer may result in many symbol decision errors being fed to the feedback filter when the channel has significant multipath distortion or a low signal to noise ratio. These errors give rise to further errors resulting in what is called error propagation within the decision feedback equalizer. This error propagation greatly degrades the performance of the decision feedback equalizer.

Because the data symbols in an 8 VSB system are trellis coded, trellis decoding can be used in the symbol decision device in order to reduce the number of symbol decision errors. The reliability of a trellis decoder is proportional to its traceback depth. Trellis decoders with a longer traceback depth produce more reliable decisions, but the decision process then incurs a longer delay. On the other hand, a zero delay trellis decoder can be constructed having a traceback depth of one. While the symbol decisions of the zero delay trellis decoder are less reliable than a trellis decoder with a longer delay, the zero delay trellis decoder is still significantly more reliable than an 8 level slicer.

It is well known that, if a symbol decision device with a delay greater than zero is used as the symbol decision device for a decision feedback equalizer, a problem is created with respect to cancellation of short delay multipath. Therefore, decision feedback equalizers for 8 VSB receivers with a zero delay 12-phase trellis decoder in the feedback loop have been described for reducing error propagation. That method is used in one embodiment of the present invention.

The output of the decision feedback equalizer 52 is fed to the long traceback trellis decoder 44 (i.e., a long delay trellis decoder having, for example, a traceback depth=32 and a delay=12×31=372 symbols). The long traceback trellis decoder 44, whose decisions are more reliable than those of the short traceback trellis decoder 42, provides the final symbol decisions for subsequent receiver stages. Also, the long traceback trellis decoder 44 provides the symbol decisions used by the least squares channel impulse and noise update estimator 62, whose output is in turn used by the tap weight calculator 64 for calculating updated tap weights for the decision feedback equalizer 52 so that the decision feedback equalizer 52 can follow channel impulse response variations that occur between training sequences.

At initialization, the initial channel impulse response estimate $\hat{h}_0$ is formed from the received training sequence by the initial channel impulse response and noise estimator 48, and an initial set of tap weights are calculated by the tap weight calculator 50 from that channel impulse response estimate $\hat{h}_0$. Then, as the decision feedback equalizer 52 runs, reliable symbol decisions are taken from the long traceback trellis decoder 44 and are used as the decoded output.

Also, relatively long pseudo training sequences b are formed from the output of the long traceback trellis decoder 44. These long pseudo training sequences are used by the least squares channel impulse and noise update estimator 62 to calculate the updated channel impulse response estimates $\hat{h}_{LS}$, and the tap weight calculator 64 uses the updated channel impulse response estimates $\hat{h}_{LS}$ to calculate updated tap weights for the decision feedback equalizer 52. This procedure allows for the tracking of time varying channel impulse responses.

The initial channel estimate calculated by the initial channel impulse response and noise estimator 48 is based on the received training sequence. Different known methods are available for calculating this initial channel estimate. For example, in a simple version of one of these known methods, the channel impulse response is of length $L_h = L_{ha} + L_{hc} + 1$ where $L_{ha}$ is the length of the anti-causal part of the channel impulse response and $L_{hc}$ is the length of the causal part of the channel impulse response. The length of the training sequence is $L_n$.

A least squares channel impulse response estimate is one choice for the initial estimate of the channel impulse response. A vector a of length $L_n$ of a priori known training symbols is given by the following expression:

$$a = [a_0, \cdots, a_{L_n-1}]^T \quad (11)$$

The vector of received symbols is given by the following equation:

$$y = [y_{L_{hc}}, \cdots, y_{L_n - L_{ha} - 1}]^T \quad (12)$$

The first received training symbol is designated $y_0$. Typically, this would mean that $y_0$ contains a contribution from the first transmitted training symbol multiplied by the maximum magnitude tap of h. Vector y contains a portion of the received training symbol sequence with no other unknown symbols, and does not include $y_0$.

A convolution matrix A of size $(L_n - L_{ha} - L_{hc}) \times (L_{ha} + L_{hc} + 1)$ may be formed from the known training symbols as given by the following equation:

$$A = \begin{bmatrix} a_{Lha+Lhc} & a_{Lha+Lhc-1} & \cdots & a_0 \\ a_{Lha+Lhc+1} & a_{Lha+Lhc} & & a_1 \\ \vdots & \vdots & & \vdots \\ a_{Ln-1} & a_{Ln-2} & \cdots & a_{Ln-Lha-Lhc-1} \end{bmatrix} \quad (13)$$

Because the vector y of received symbols is given by the following equation:

$$y = Ah + v \quad (14)$$

where h is the channel impulse response vector of length $L_h$ and v is a noise vector, the least squares channel impulse response estimate is given by the solution of equation (14) according to the following equation:

$$\hat{h}_0 = (A^T A)^{-1} A^T y \quad (15)$$

However, this method is only effective if $L_n$ satisfies the following inequality:

$$L_n \geq 2L_h - 1 \quad (16)$$

If the training sequence is too short with respect to the length of the channel impulse response, then this method does not produce a good result because the system of equations (14) to be solved is underdetermined, which is often the case for 8 VSB terrestrial channels. For example, with $L_n = 704$, the channel impulse response must be less than 352 symbols long. However, longer channel impulse responses are commonly found in practice.

A better method for finding the channel impulse response is based on a modified convolution matrix A. A long vector a of length $L_n$ of a priori known training symbols is again given by the expression (11). However, the convolution matrix A this time is an $(L_n + L_{ha} + L_{hc}) \times L_h$ convolution matrix comprising training symbols and zeros and given by the following equation:

$$A = \begin{bmatrix} a_0 & 0 & \cdots & \cdots & 0 \\ \vdots & a_0 & 0 & & \vdots \\ \vdots & & & & \vdots \\ \vdots & & & 0 & 0 \\ a_{Lh-2} & \cdots & \cdots & a_0 & 0 \\ a_{Lh-1} & \cdots & \cdots & \cdots & a_0 \\ \vdots & & & & \vdots \\ a_{Ln-1} & \cdots & \cdots & \cdots & a_{Ln-Lh} \\ 0 & a_{Ln-1} & & & a_{Ln-Lh-1} \\ \vdots & & 0 & & \\ \vdots & & & a_{Ln-1} & a_{Ln-2} \\ 0 & \cdots & \cdots & 0 & a_{Ln-1} \end{bmatrix} \quad (17)$$

The vector of received symbols is given by the following equation:

$$y = [y_{-Lha}, \cdots, y_0, \cdots, y_{Ln+Lhc-1}]^T \quad (18)$$

where $y_0$ through $Y_{Ln-1}$ are the received training symbols. So, the vector of equation (18) contains the known training symbols as well as random symbols before and after the training sequence.

Again, equation (14) needs to be solved. Now, the convolution matrix A is a taller matrix because zeros have been substituted for the unknown symbols that surround the training sequence. This new convolution matrix A yields an over-determined system of equations.

The initial channel impulse response and noise estimator 48 solves equation (14) according to equation (15) using the new convolution matrix A of equation (17) and vector y of equation (18) to produce the initial channel impulse response estimate $\hat{h}_0$. More complicated methods may be utilized to give even more accurate results if necessary.

The tap weight calculator 50 uses the initial channel impulse response estimate $\hat{h}_0$ to calculate an initial set of minimum mean square error (MMSE) tap weights for the decision feedback equalizer 52. Methods for calculating minimum mean square error tap weights from a channel impulse response are well known. Alternatively, tap weight calculator 50 may use other methods such as the zero-forcing method to calculate the tap weights.

Accurate channel impulse response estimate updates can also be calculated between training sequences (when only a priori unknown symbols are received). For example, a least squares channel impulse response estimation may be calculated from an over determined system of equations. Dynamic changes to the channel impulse response may be accurately tracked by using receiver trellis decoder decisions on input symbols to form a long sequence of near perfectly decoded symbols. This sequence should have relatively few errors, even near threshold, and is selected to be long enough so that the underdetermined system problem of the "too short" 8 VSB training sequence is eliminated. The channel impulse response may be, for example, updated as often as once per segment (or more or less often).

The updated channel impulse response to be estimated is, as before, of length $L_h = L_{ha} + L_{hc} + 1$ where $L_{ha}$ is the length of the anti-causal part of the channel impulse response and $L_{hc}$ is the length of the causal part of the channel impulse response. A vector b is defined as the reliable trellis decoder decisions on the input symbols of length $L_b$, and is provided by the long traceback trellis decoder 44. Also, a Toeplitz matrix B is defined according to the following equation:

$$B = \begin{bmatrix} b_{Lh-1} & b_{Lh-2} & \cdots & \cdots & b_0 \\ \vdots & b_{Lh-1} & \cdots & \cdots & \vdots \\ \vdots & \cdots & & \cdots & \vdots \\ \vdots & \cdots & & \cdots & b_{Lh-1} \\ \vdots & \cdots & & \cdots & \vdots \\ \vdots & \cdots & & b_{Lb-Lh} & \vdots \\ b_{Lb-1} & b_{Lb-2} & \cdots & \cdots & b_{Lb-Lh} \end{bmatrix} \quad (19)$$

where the elements are real and consist of the symbol decisions of vector b. To ensure an over determined system of equations, $L_b$ is given by the following inequality:

$$L_b \geq 2L_h - 1 \quad (20)$$

The Toeplitz matrix B is of dimension $(L_b - L_h + 1) \times L_h$ with $(L_b - L_h + 1) \geq L_h$.

The received signal vector is y with elements $y_i$ for $L_{hc} < i \leq (L_b - L_{ha} - 1)$ where $y_i$ is the received symbol corresponding to input symbol decision $b_i$. Typically this correspondence would mean that $y_i$ contains a contribution from $b_i$ multiplied by the maximum magnitude tap weight of h. The received signal vector y is given by the following equation:

$$y = Bh + v \quad (21)$$

where h is the $L_h$ long channel impulse response vector and v is a noise vector. The least squares solution for h is given by the following equation:

$$\hat{h}_{LS} = (B^T B)^{-1} B^T y \quad (22)$$

By utilizing reliable trellis decoder input symbol decisions, there is sufficient support for calculating a channel impulse response estimate with the required delay spread. As required by inequality (20), the vector b of symbol decisions must be at least twice as long as the channel impulse response being estimated. The system of equations is sufficiently over determined in order to diminish the adverse affect of additive White Gaussian Noise (AWGN). Therefore, a vector b of symbol decisions that is longer than twice the channel impulse response length is preferred.

The tap weight calculations performed by the tap weight calculator 50 and the tap weight calculator 64 require not only a channel impulse response estimate but also a noise estimate. The noise may be estimated by calculating an estimate of the received vector y according to $\hat{y} = A\hat{h}$ where $\hat{h}$ is the latest calculated channel impulse response estimate. Then, the noise estimation is given by the following equation:

$$\hat{\sigma}^2 = \frac{\|\hat{y} - y\|^2}{\text{length}(y)} \quad (23)$$

where $\|.\|$ is the 2-norm.

In order to apply the above equations to an 8 VSB receiver, the following parameters may be used as an example: $L_h = 512$, $L_{ha} = 63$, $L_{hc} = 448$, $L_b = 2496$, and $L_n = 704$. The vector b is formed from a sequence of trellis decoder decisions made by the long traceback trellis decoder 44 on the input symbols. The delay ($31 \times 12 = 372$) of the long traceback trellis decoder 44 is not significant compared to a channel impulse response estimate update rate of once per segment. Normally, the long traceback trellis decoder 44 would just make output bit pair decisions, but it can also make equally reliable decisions on the input symbols.

The vector b, for example, may be selected as 3 segments ($L_b$=2496 symbols) long. So, three data segments may be used to produce a single channel impulse response estimate update. A new channel impulse response update can be obtained once per segment by proceeding in a sliding window manner. Optionally, several consecutive channel impulse response estimate updates can be averaged in order to further improve channel impulse response accuracy if necessary. This additional averaging can be a problem if the channel impulse response is varying rapidly.

A vector b with fewer than three segments of symbol decisions may be used. However, as stated in inequality (20), the length of the vector b must be at least twice as long as the channel impulse response to be estimated. As previously stated, long b vectors helps to diminish the adverse effects of AWGN.

Figure 6:
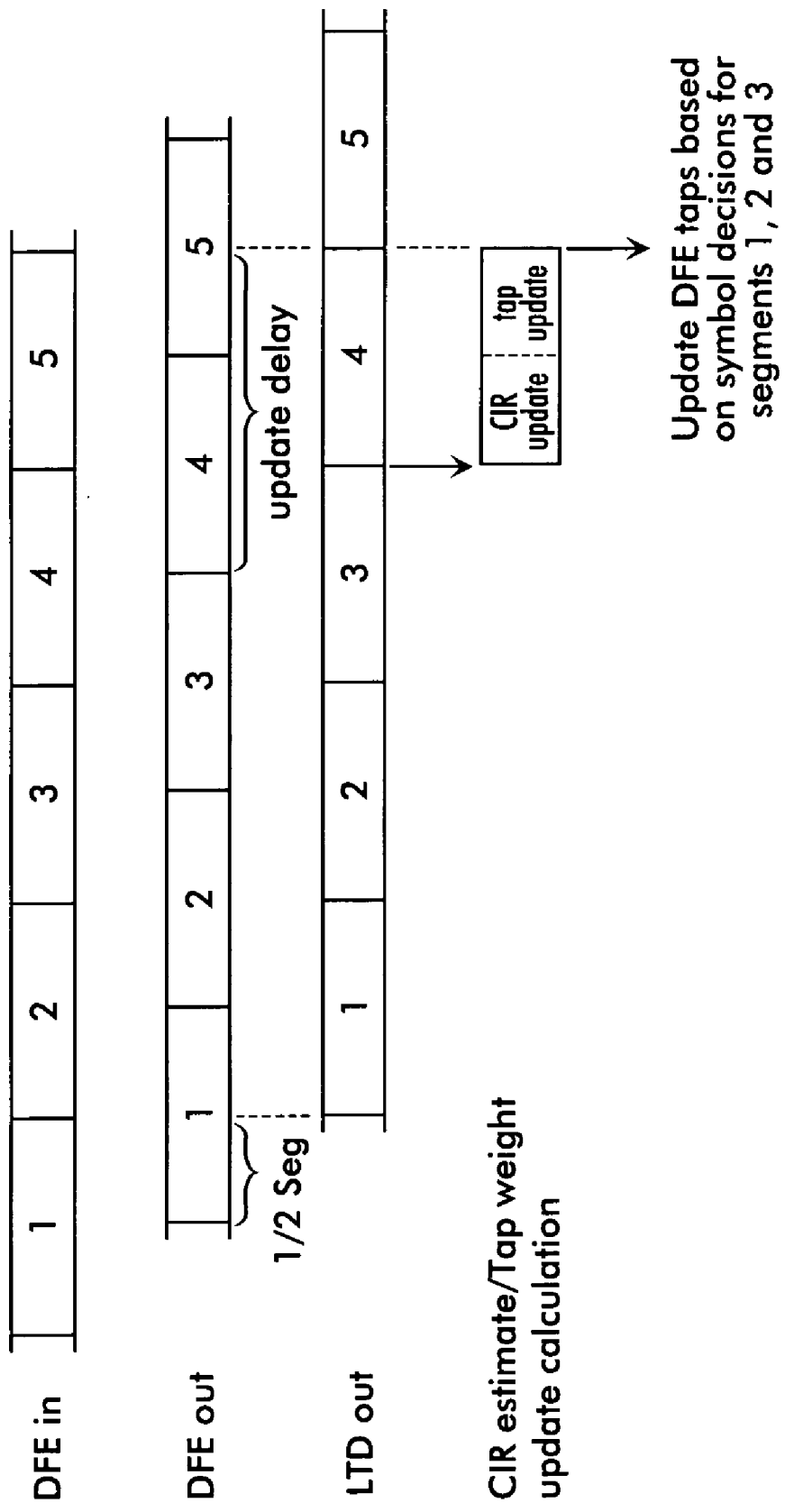
FIG. 6 is a timing diagram illustrating the non-zero time period required for the calculation of a channel impulse estimate and updated tap weights.

The timing diagram of FIG. 6 illustrates that a non-zero time period is required for the least squares channel impulse and noise update estimator 62 and the tap weight calculator 64 of FIG. 5 to calculate an updated channel impulse estimate $\hat{h}_{LS}$ and updated tap weights for the decision feedback equalizer 52. The first row of the timing diagram represents a series of segment time periods containing corresponding segments of received symbols y as they are output from the synchronization circuit 46. The second row represents the delay that shows that the processing of the decision feedback equalizer 52 imposes on these segment time periods as the corresponding equalized segments exit from the output of the decision feedback equalizer 52 and are provided to the long traceback trellis decoder 44. As shown in FIG. 6, the processing of the decision feedback equalizer 52 delays the segments in time relative to the corresponding segments at the input of the decision feedback equalizer 52. The third row represents the additional delay that the processing of the long traceback trellis decoder 44 imposes on these segment time periods as the corresponding segments of symbol decisions exit from the output of the long traceback trellis decoder 44 and are provided to the least squares channel impulse and noise update estimator 62. As shown in FIG. 6, the processing of the long traceback trellis decoder 44 delays the symbol decisions in time relative to the corresponding equalized segments at the input of the long traceback trellis decoder 44.

For the sake of convenience (and not necessity), it may be assumed that a time period equal to one segment (832 symbol clocks for 8 VSB) is required to calculate the updated channel impulse estimate $\hat{h}_{LS}$ and the updated tap weights. It may also be assumed that the long traceback trellis decoder 44 has a processing delay of ½ segment. With these assumptions, the updated tap weights calculated by the tap weight calculator 64 from vector b comprising the symbol decisions in the three segment time periods 1, 2, and 3 will not be applied to the decision feedback equalizer 52 until after the second half of the equalized segment in segment time period 5 begins being output from the decision feedback equalizer 52. This corresponds to a 1.5 segment update delay. In a channel whose channel impulse response is rapidly changing, this delay between (i) the time that segments are processed by the decision feedback equalizer 52 and (ii) the time at which the updated tap weights calculated on the basis on these segments are applied to the decision feedback equalizer 52 may degrade performance of the decision feedback equalizer 52 because the channel impulse response changes too much between the end of segment 3 and the beginning of segment 5.

The tracking capability of the decision feedback equalizer 52 for time varying channel impulse responses can be improved by (1) updating more often or (2) reducing update delay.

Figure 7:
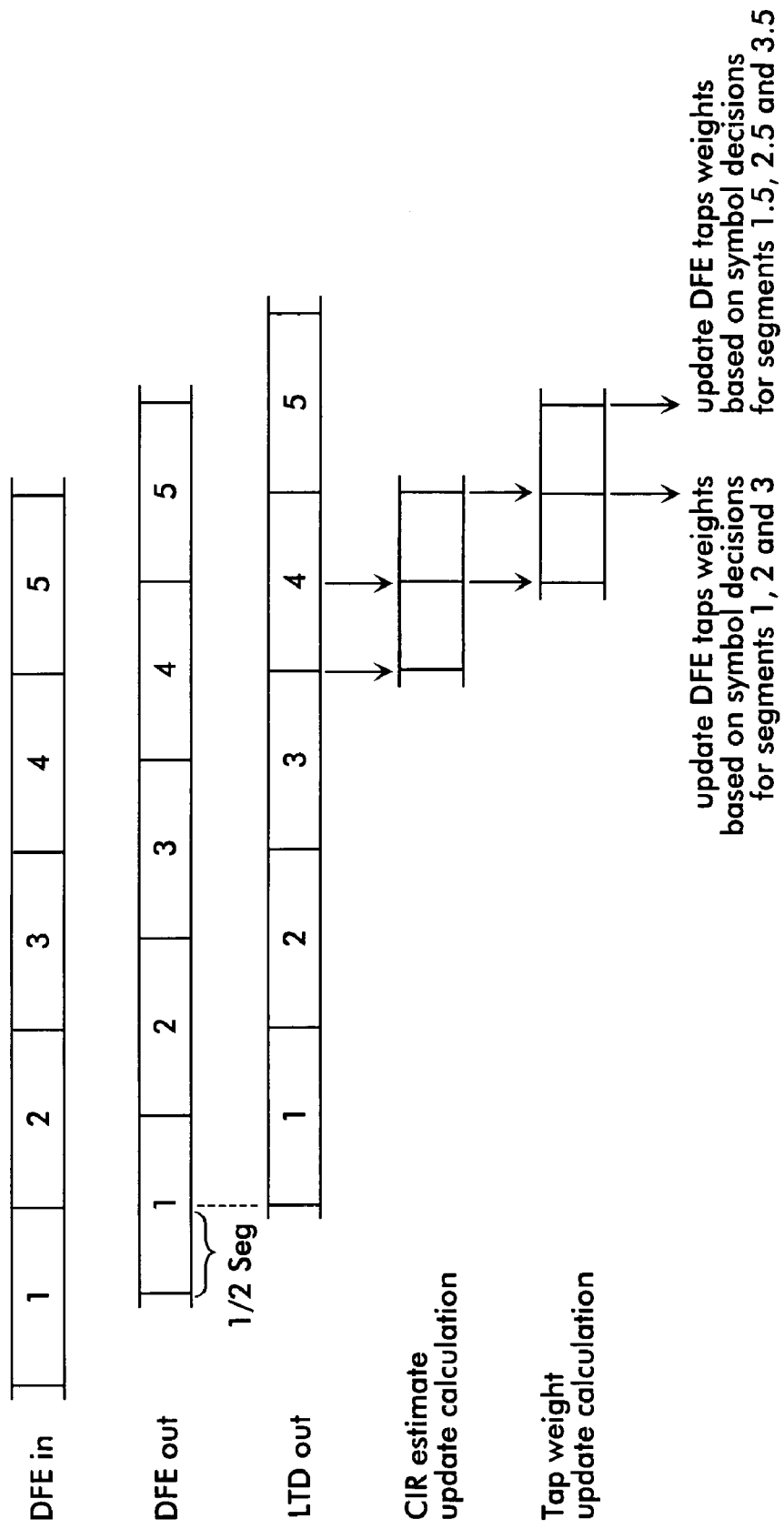
FIG. 7 is a timing diagram illustrating a first method for improving performance of a decision feedback equalizer in the presence of time varying channel impulse responses.

A first method for improving performance of the decision feedback equalizer 52 in the presence of time varying channel impulse responses is shown in the timing diagram of FIG. 7. Because the channel impulse response estimate update and the tap weight update are two separate operations, they may be run in a pipelined manner. As shown in FIG. 6, it is clear that the least squares channel impulse and noise update estimator 62 is idle ½ of the time. The same is true for the tap weight calculator 64. If they are instead operated in a pipelined manner, the update rate can be doubled without additional hardware and without running the least squares channel impulse and noise update estimator 62 or the tap weight calculator 64 at a faster speed. When operating in a pipelined mode, their respective idle times are eliminated. This is illustrated by the enable signal of FIG. 8. As previously described, when the tap weights are updated based on the output (vector b) of the long traceback trellis decoder 44 for segments 1, 2, and 3, the new tap weights will not be applied until after segment 5 is being output by the decision feedback equalizer 52 due to the update calculation time delay (the update delay is not improved).

However, as shown in the fourth row of FIG. 7, the update rate can be increased from once per segment to twice per segment. In order to calculate the tap weights twice per segment, the three segment sliding window is moved in ½ segment increments. This increase in the update rate can be achieved without an increase in hardware complexity or operating speed as compared to the once per segment update rate described above. Accordingly, this first method improves dynamic channel impulse response tracking because the tap weights are updated before the channel impulse response changes significantly to cause significant error to be propagated through the long traceback trellis decoder 44.

Figure 8:
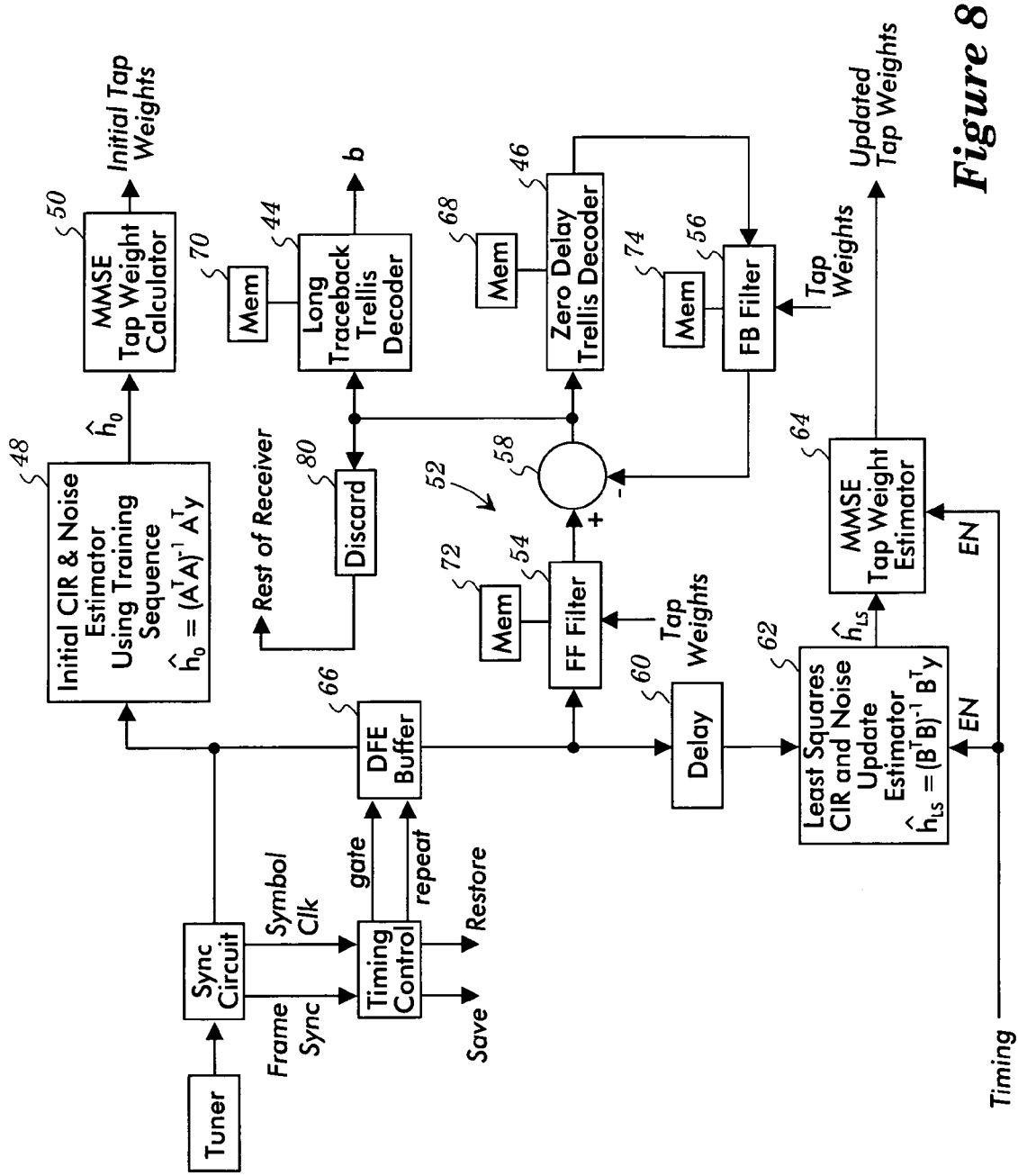
FIG. 8 illustrates a tracking decision feedback equalizer system implementing a second method for improving performance of a decision feedback equalizer in the presence of time varying channel impulse responses; and, FIG. 9 is a timing diagram for the tracking decision feedback equalizer system of FIG. 8.
Figure 9:
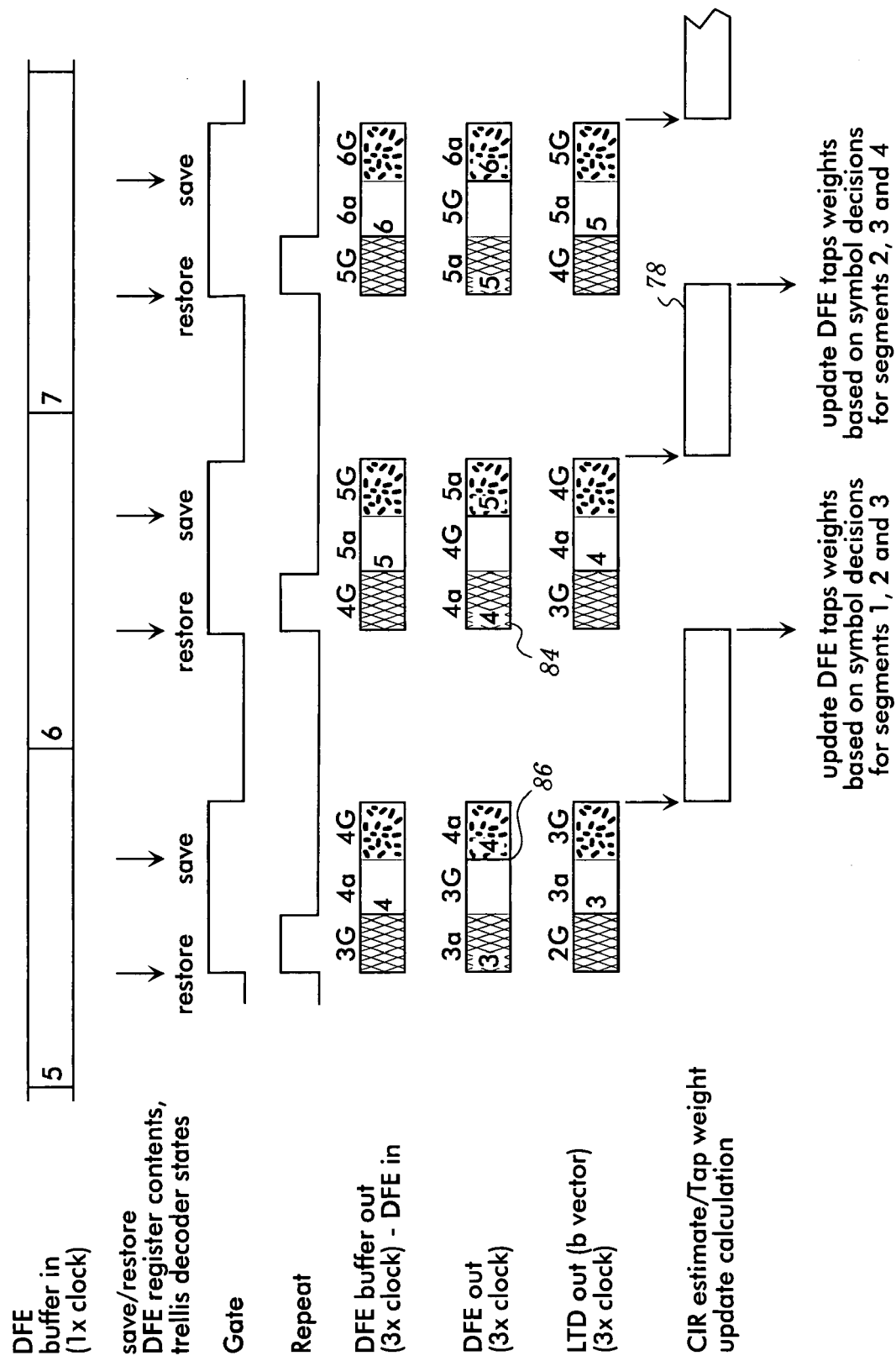

A second method for improving performance of the decision feedback equalizer 52 in the presence of time varying channel impulse responses is shown in FIGS. 8 and 9. Referring to FIG. 6, it should be noted that even if the time required to calculate the channel impulse response update and the tap weight update was reduced to ½ segment, an update delay of one segment would still result. This second method effectively removes that update delay.

As shown in FIG. 8, the tracking decision feedback equalizer system of FIG. 5 is modified by adding a decision feedback equalizer buffer 66 at the inputs to the decision feedback equalizer 52 and to the delay 60. Also, a memory 68 is provided for the short traceback trellis decoder 42, a memory 70 is provided for the long traceback trellis decoder 44, a memory 72 is provided for the feed forward filter 54, and a memory 74 is provided for the feedback filter 56. A timing control 76 is further added to provide gate and repeat signals to the decision feedback equalizer buffer 66 and save and restore signals to the memories 68, 70, 72, and 74. The timing control 76 is responsive to the frame sync and symbol clock signals provided by the synchronization circuit 46.

The decision feedback equalizer buffer 66 allows data to be clocked in at one rate and out at a different rate. Furthermore, the decision feedback equalizer buffer 66 has additional storage that allows certain portions of data to be output twice (first time, then repeated). The data y is continuously clocked into the decision feedback equalizer buffer 66 at the symbol clock rate S. The data y is clocked out of the decision feedback equalizer buffer 66 in a gated manner at a rate nS where n, for example, may be three so that the data y is clocked out of the decision feedback equalizer buffer 66 at three times the symbol clock rate.

For simplicity (not necessity) of illustration, it may be assumed that the delay from the time that data y enters the decision feedback equalizer 52 to the time that the equalized data y exits the decision feedback equalizer 52 is ½ segment, and that the delay from the time that the equalized data y enters the long traceback trellis decoder 44 to the time that symbol decisions corresponding to the equalized data y exit the long traceback trellis decoder 44 is also ½ segment.

In view of the above description, the decision feedback equalizer buffer 66 continuously reads in symbol data y at the symbol clock rate S and, when its gate signal input is active, outputs the symbol data y at n times the symbol clock rate, i.e., nS. When the repeat signal input of the decision feedback equalizer buffer 66 is active, the decision feedback equalizer buffer 66 outputs the previous ½ segment of data again. The fraction ½ is exemplary only.

The decision feedback equalizer 52, in response to the save signal, stores the state of the short traceback trellis decoder 42 in the memory 68, stores the state of the long traceback trellis decoder 44 in the memory 70, stores the contents of the feed forward filter 54 in the memory 72, and stores the contents of the feedback filter 56 in the memory 74. The states of the short and long traceback trellis decoders 42 and 44 and the contents of the feed forward filter 54 and the feedback filter 56 may be referred to as DFE system information. The appropriate DFE system information can be restored to the short and long traceback trellis decoders 42 and 44 and to the feed forward and feedback filters 54 and 56 at a later time in response to the restore signal.

The advantages of the tracking decision feedback equalizer system shown in FIG. 8 are illustrated in the timing diagram of FIG. 9. The first row shows the segment time periods of data y input to the decision feedback equalizer buffer 66, clocked continuously at the symbol rate S. The second row shows when the save and restore signals are applied to the memories 68, 70, 72, and 74. The third row shows when the gate signal is applied to the decision feedback equalizer buffer 66. The fourth row shows when the repeat signal is applied to the decision feedback equalizer buffer 66.

The fifth row shows the output of the decision feedback equalizer buffer 66 as controlled by the gate and repeat signals for several segments. The darker vertical lines indicate segment boundaries, the stippled portions indicate data that will be repeated, and the cross-hatched portions indicate data that is being repeated. It can be seen that, halfway through the output of the data in segment 4 from the decision feedback equalizer buffer 66, the save signal is activated, saving the DFE system information as previously described. Then, at the end of the output of the data in segment 4 from the decision feedback equalizer buffer 66, the output of the decision feedback equalizer buffer 66 is gated off for a period of time. When the decision feedback equalizer buffer 66 is gated on, the restore signal is activated restoring the DFE system information (at the time of the previous save), and the repeat signal is activated causing the decision feedback equalizer buffer 66 to again output the second half of segment 4. This process is executed continuously for every segment.

The resulting outputs from the decision feedback equalizer 52 and the long traceback trellis decoder 44 are shown in the sixth and seventh rows of FIG. 9. The eighth row of FIG. 9 shows the timing of the channel impulse response estimate and tap weight update calculations which occur during the output gate off period of the decision feedback equalizer buffer 66. These off periods may alternatively be referred to as void times. Examining the timing of the channel impulse response and tap weight estimate updates, it can be seen that the update due to the b vector for segments 1, 2 and 3 is applied to the decision feedback equalizer 52 when segment 4 is output by the decision feedback equalizer 52, instead of when segment 5 is output by the decision feedback equalizer 52. This operation greatly improves the dynamic channel impulse response tracking ability of the decision feedback equalizer 52 because of the effective elimination in delay time between the symbol decisions of the long traceback trellis decoder 44 and applying the results of those decisions to the decision feedback equalizer 52.

The b vector that is derived from the output of the long traceback trellis decoder 44 and that is used for the update calculations at the start of segment 4 consists of segment 1 [white, cross-hatched], segment 2 [white, cross-hatched], and segment 3 [white, stippled].

It can be seen that, as the process moves along and the b vector is updated segment by segment, the last stippled portion is replaced by its corresponding cross-hatched portion (due to repeating of data from the decision feedback equalizer buffer 66).

As indicated above, the output of the decision feedback equalizer buffer 66 is shown in the fifth row of FIG. 9. This output comprises bursts (or sections) of three ½ segments (i.e., symbols are output at n times the symbol rate where n, in the example, is three), with the first ½ segment being a repeat of the last ½ segment of the previous burst, and the next two ½ segments being the segment occurring after the repeated segment. Thus, as shown in the middle column of FIG. 9, the repeated ½ segment is designated 4b and the next two ½ segments are designated 5a and 5b. These bursts are applied to the input of the decision feedback equalizer 52 and result in an output from the decision feedback equalizer 52 (the decision feedback equalizer 52 is characterized by a ½ segment delay) as shown in the sixth row. The seventh row is the output of the long traceback trellis decoder 44. The long traceback trellis decoder 44 is also characterized by a ½ segment delay. The decision feedback equalizer 52 and the long traceback trellis decoder 44 are also operated at n times the symbol clock S.

Because bursts of n/2 (1.5 segments in the example of FIG. 9) are output from the decision feedback equalizer buffer 66, the decision feedback equalizer 52, and the long traceback trellis decoder 44 at n times the symbol rate, periods of void time (i.e., no symbols) are provided between the bursts during which update calculations can be performed. For example, an update calculation 78 is performed between the bursts of the 2nd and 3rd columns. The update calculation 78 is based on vector b consisting of the three immediately prior segments, which are 4a(white)/4b (stippled), 3a(white)/3b(cross-hatch) and 2a(white)/2b (cross-hatch). It will be observed that, when the update calculation 78 is complete (based on segments 2, 3, and 4), the update calculation 78 is applied to the decision feedback equalizer 52 when segment 5 (actually 5a(cross-hatch)/5b (white) begins being output by the decision feedback equalizer 52, which is the preferred timing. It will also be noted that the stippled ½ segments in the output of the decision feedback equalizer 52 are discarded by a discarder 80 before the segments are applied to the rest of the receiver for further processing.

Also, because of the repeat of certain ½ segments by the decision feedback equalizer buffer 66, the values of the tap weights of the feed forward filter 54 and the feedback filter 56 and the values of the decoder states of the short traceback trellis decoder 42 and the long traceback trellis decoder 44 (i.e., the system values) must be suitably managed. For example, the system values at time 84 (when the first ½ of repeated segment 4 begins being output to the least squares channel impulse and noise update estimator 62) should be the same as the values at time 86 (when the first ½ of segment 4 begins being output from the decision feedback equalizer 52 in the previous burst). This control of the DFE system information values is accomplished by saving the system values in the memories 68, 70, 72, and 74 at time 86 and restoring them to the feed forward filter 54, the feedback filter 56, the short traceback trellis decoder 42, and the long traceback trellis decoder 44 at time 84.

Certain modifications of the present invention have been discussed above. Other modifications of the present invention will occur to those practicing in the art of the present invention. For example, the decoders 42 and 44 are described above as 12-phase trellis decoders. The use of 12-phase trellis decoders is, for the most part, specific to the digital television application in compliance with the ATSC standard. For other applications, however, decoders other than 12-phase trellis decoders may be used.

Also, as shown above, the short traceback trellis decoder 42 is used to feed back symbol decisions to the feedback filter 56. Instead, a data slicer could be used for this purpose.

Moreover, instead of updating the channel impulse response estimate and tap weights every ½ segment in connection with the embodiment of the invention shown in FIG. 7, the channel impulse response estimate and tap weights can be updated faster or slower than every ½ segment.

Furthermore, instead of operating the decision feedback equalizer buffer 66 at three times the symbol clock, the decision feedback equalizer buffer 66 could instead be operated faster or slower.

Accordingly, the description of the present invention is to be construed as illustrative only and is for the purpose of teaching those skilled in the art the best mode of carrying out the invention. The details may be varied substantially without departing from the spirit of the invention, and the exclusive use of all modifications which are within the scope of the appended claims is reserved.

We claim:

1. A method of operating an equalizer comprising:
continuously storing input data segments of received symbols in a decision feedback equalizer buffer at a symbol rate S;
supplying output data sections of received symbols from the decision feedback equalizer buffer at an output rate of nS such that void times separate the output data sections, wherein n>1;
equalizing the received symbols supplied by the decision feedback equalizer buffer in a decision feedback equalizer to provide equalized symbols;
decoding the equalized symbols by a decoder to provide decoded symbols;
calculating adjustments for the decision feedback equalizer during the void times such that the adjustments are calculated based on both the received symbols supplied by the decision feedback equalizer buffer and the decoded symbols; and,
applying the adjustments to the decision feedback equalizer.

2. The method of claim 1 wherein n=3.

3. The method of claim 1 wherein each output data section comprises first, second, and third portions, wherein the first portion comprises received symbols repeated from a prior output data section, and wherein the second and third portions comprise the received symbols in a received data segment following the repeated received symbols.

4. The method of claim 3 wherein the applying of the adjustments to the decision feedback equalizer comprises applying the adjustments at the beginning of the next output data section following a corresponding void time.

5. The method of claim 3 wherein the method further comprises discarding the repeated received symbols at an output of the decision feedback equalizer.

6. The method of claim 5 wherein the applying of the adjustments to the decision feedback equalizer comprises applying the adjustments at the beginning of the next output data section following a corresponding void time.

7. The method of claim 6 wherein n=3.

8. The method of claim 3 further comprising:
storing states of the decoder and the decision feedback equalizer at the beginning of the third portion of each supplied section; and,
restoring the states to the decoder and the decision feedback equalizer at the beginning of the next section supplied by the decision feedback equalizer buffer.

9. The method of claim 8 wherein the applying of the adjustments to the decision feedback equalizer comprises applying the adjustments at the beginning of the next output data section following a corresponding void time.

10. The method of claim 8 wherein the method further comprises discarding the repeated received symbols at an output of the decision feedback equalizer.

11. The method of claim 10 wherein the applying of the adjustments to the decision feedback equalizer comprises applying the adjustments at the beginning of the next output data section following a corresponding void time.

12. The method of claim 11 wherein n=3.

13. The method of claim 1 wherein the decision feedback equalizer comprises taps having tap weights, wherein the calculating of adjustments for the decision feedback equalizer comprises (i) estimating a channel impulse response based on the received symbols supplied by the decision feedback equalizer buffer and based on the decoded symbols, and (ii) calculating the tap weights for the decision feedback equalizer based on the estimated channel, and wherein the applying of the adjustments to the decision feedback equalizer comprises applying the calculated tap weights to the decision feedback equalizer.

14. A method of operating an equalizer comprising:
continuously storing input data segments of received symbols in a decision feedback equalizer buffer at a symbol rate S;
supplying output data sections of received symbols from the decision feedback equalizer buffer at an output rate of nS such that void times separate the output data sections, wherein n>1;
equalizing the received symbols supplied by the decision feedback equalizer buffer in a decision feedback equalizer to provide equalized symbols, wherein the decision feedback equalizer comprises taps having tap weights;
decoding the equalized symbols by a decoder to provide decoded symbols;
estimating a channel impulse response based on both the received symbols supplied by the decision feedback equalizer buffer and the decoded symbols;

calculating the tap weights for the decision feedback equalizer based on the estimated channel, wherein the estimating of the channel impulse response and the calculating of the tap weights are performed during the void times; and, applying the calculated tap weights to the decision feedback equalizer.

15. The method of claim 14 wherein n>2.

16. The method of claim 14 wherein n=3.

17. The method of claim 14 wherein each output data section comprises first, second, and third portions, wherein the first portion comprises received symbols repeated from a prior output data section, and wherein the second and third portions comprise the received symbols in a received data segment following the repeated received symbols.

18. The method of claim 17 wherein the applying of the adjustments to the decision feedback equalizer comprises applying the adjustments at the beginning of the next output data section following a corresponding void time.

19. The method of claim 17 wherein the method further comprises discarding the repeated received symbols at an output of the decision feedback equalizer.

20. The method of claim 19 wherein the applying of the adjustments to the decision feedback equalizer comprises applying the adjustments at the beginning of the next output data section following a corresponding void time.

21. The method of claim 20 wherein n=3.

22. The method of claim 17 further comprising:
storing states of the decoder and the decision feedback equalizer at the beginning of the third portion of each supplied section; and,
restoring the states to the decoder and the decision feedback equalizer at the beginning of the next section supplied by the decision feedback equalizer buffer.

23. The method of claim 22 wherein the applying of the adjustments to the decision feedback equalizer comprises applying the adjustments at the beginning of the next output data section following a corresponding void time.

24. The method of claim 22 wherein the method further comprises discarding the repeated received symbols at an output of the decision feedback equalizer.

25. The method of claim 24 wherein the applying of the adjustments to the decision feedback equalizer comprises applying the adjustments at the beginning of the next output data section following a corresponding void time.

26. The method of claim 25 wherein n=3.

27. A method of operating an equalizer comprising:
supplying segments of received symbols to the equalizer to produce equalized segments, wherein each of the segments of received symbols occupies a corresponding segment time period;
decoding the equalized segments by a decoder to produce decoded segments;
calculating adjustments for the equalizer based on n decoded segments and n segments of received symbols, wherein n≧1, and wherein the calculating of adjustments is performed in a pipelined manner at least twice per segment time period; and,
applying the adjustments to the equalizer.

28. The method of claim 27 wherein n=3.

29. The method of claim 28 wherein the calculating of adjustments comprises:
calculating a first set of adjustments based on data in segments time periods one, two, and three; and,
calculating a second set of adjustments based on (i) data in only a latter portion of segment time period one, (ii) data in all of segment time period two, (iii) data in all of segment time period three, and, (iv) data in only a beginning portion of segment time period four.

30. The method of claim 27 wherein each of the segments of received symbols includes at least 700 symbols.

31. A method of operating an equalizer comprising:
continuously storing received symbols in a buffer at a symbol rate S and a symbol period T;
supplying output symbols from the buffer at an output rate of nS such that void times separate corresponding pluralities of output symbols, wherein n>1, and wherein each void time is greater than T;
equalizing the received symbols supplied by the buffer in an equalizer to provide equalized symbols;
decoding the equalized symbols by a decoder to provide decoded symbols;
calculating adjustments for the equalizer during the void times such that the adjustments are calculated based on both the received symbols supplied by the buffer and the decoded symbols; and,
applying the adjustments to the equalizer.

32. The method of claim 31 wherein the equalizer comprises taps having tap weights, wherein the calculating of adjustments for the equalizer during the void times comprises (i) estimating a channel impulse response during each of the void times, wherein the channel impulse responses are based on the received symbols supplied by the buffer and are based on the decoded symbols, and (ii) calculating the tap weights for the equalizer during each of the void times, wherein the tap weights are based on a corresponding one of the estimated channels, and wherein the applying of the adjustments to the equalizer comprises applying the calculated tap weights to the equalizer.

33. The method of claim 31 wherein the supplying of output symbols from the buffer comprises supplying the output symbols from the buffer in bursts such that each burst contains a plurality of output symbols and such that each void time is between a corresponding pair of bursts.

34. The method of claim 1 wherein the calculating of adjustments for the equalizer during the void times comprises calculating a complete set of adjustments for the equalizer during each of the void times.

* * * * *